United States Patent Office 2,747,374
Patented May 29, 1956

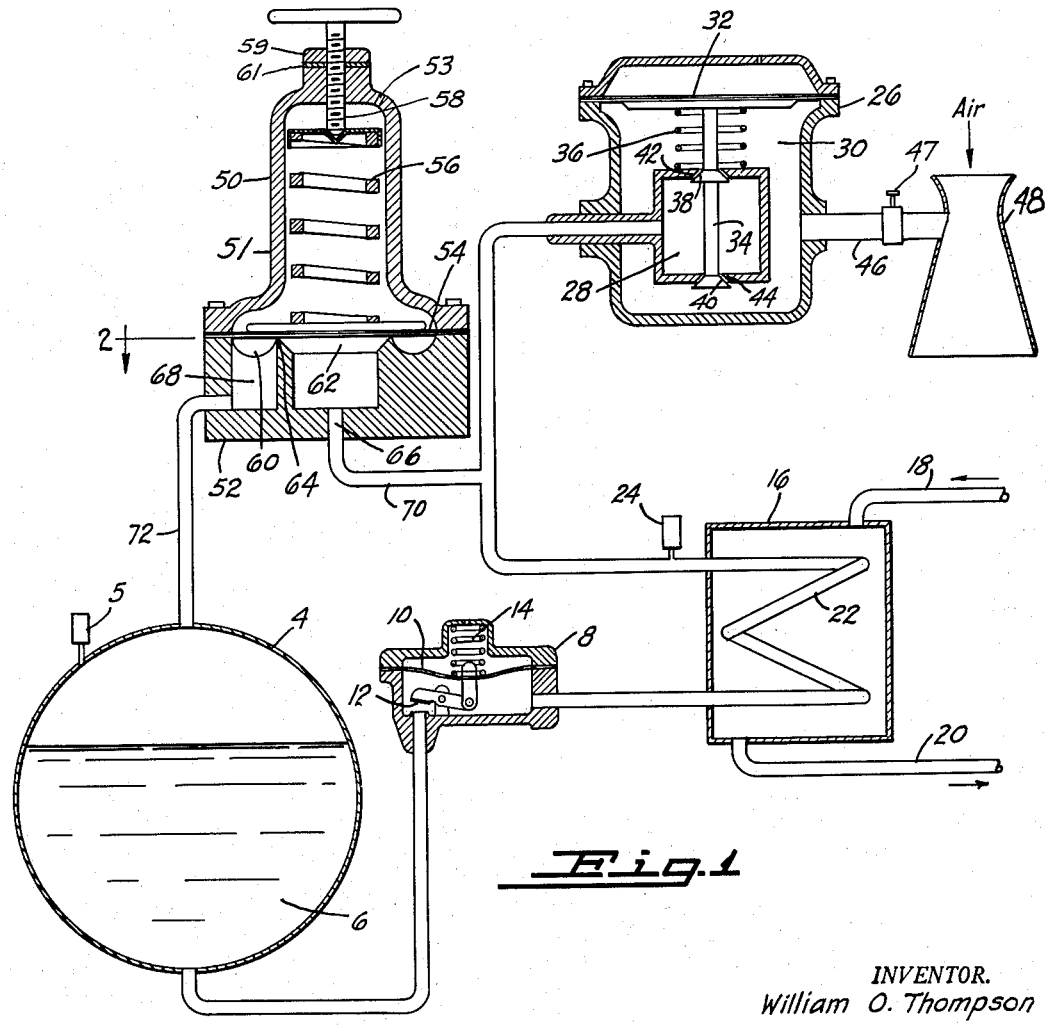

2,747,374
LIQUEFIED GAS SYSTEM

William O. Thompson, San Francisco, Calif.

Application August 30, 1951, Serial No. 244,389

3 Claims. (Cl. 62—1)

This invention relates to a system and equipment for the handling and vaporization of liquefied gases. As will hereinafter appear, the system may be used with any liquefiable gas and is therefore a system of broad application. However, one of the typical applications of the system is to the operation of motor vehicles, or other internal combustion engines, using a liquefied gas, such as propane, as a fuel and the description of the invention which follows is directed to such an application. It must be understood that such description is only given as one particular application of the system.

Liquefied petroleum gases are frequently used as a fuel for internal combustion engines as in passenger buses, trucks and farm tractors. The use of such fuels has greatly increased over the past few years as they are generally more desirable as well as cheaper than the normally liquid hydrocarbons, although certain difficulties have presented themselves in the employment of these gases as motor vehicle fuels. As will be seen, it is a purpose of this invention to minimize, or eliminate, these difficulties.

Propane, butane and mixtures thereof have been used with success in domestic, commerical, industrial and utility applications for heating, cooking, refrigeration and standby but the variations in specific gravity and B. t. u. content of the mixtures has occasioned some difficulty. This difficulty is currently being eliminated by the inherent value of the constituents other than propane which are being extracted for chemical processing and other uses. Thus reasonably pure propane is the liquefied petroleum gas generally available and is, in fact, the only one guaranteed by producers to be available in the future.

Propane is particularly desirable for use in internal combustion engines because of an octane rating of over 120 vs. a rating of about 90 for butane and 60 to 80 for the commercially available gasolines. However, propane has a vapor pressure of approximately 180 p. s. i. g. at 100° F., and is handled under pressure and introduced into the engine in the gaseous phase. While a gaseous fuel is desirable to the operator because of the absence of crank case dilution and wetting of cylinder walls, the high vapor pressures inherent with this fuel have proved objectionable to authorities governing in certain localities due to the hazard created by the release of fuel through relief valves and operators have objected to this wasteful disposition of gas. Such objectional release of high pressures may occur when the storage tank is subjected to high ambient temperatures or reflected road heat or exhaust conditions or when the engine demand for gas changes so that a pressure build up occurs in the heat exchanger. Any of these conditions may result in the operation of a safety relief valve which emits fuel to the atmosphere in a hazardous and wasteful manner.

Furthermore, when such equipment is operated in the conventional manner, the high pressure built up in the storage tank at times due to high ambient temperatures, and other heat inflow, is such that it is difficult to refill the storage tank. Also, the conventional vaporizing systems ordinarily draw liquid from the bottom of the tank, pass it through a pressure reducing valve and vaporize it in a heat exchanger and, if the heat exchanger is cold, there is frequently insufficient vaporization of fuel to start the engine. On the other hand, there is ordinarily a sufficiency of vapor in the enclosed space above the liquid level in the storage tank for use in starting, but such vapor is not available since the conventional system does not permit the removal of vapor from the top of the storage tank.

Ordinarily, after mobile equipment is operated and brought in to refill from the storage tank, it will be found that the temperature of the mobile fuel tank is higher than that of the fixed storage tank due to the inflow of reflected heat from road and field conditions as well as from proximity to the engine exhaust. Thus, a higher pressure exists in the vehicle fuel tank than in the fixed storage tank and to transfer fuel, it is often necessary to connect a vapor equalizing line in addition to a pumping line to accomplish transfer of fuel. Furthermore, if the fixed storage is underground a pump will not lift the liquid from this tank, since it is at its boiling point. A vapor transfer compressor will be necessary requiring additional connections and involving potential hazard and waste.

It is therefore one object of my invention to provide a handling system for liquefied gas wherein the storage pressure is below the point dictated by ambient temperatures and is maintained between predetermined points during operation.

Another object of my invention is to provide for the relief, internally of the vaporizing system, of excessive pressures built up within a heat exchanger under conditions of varying demand. Since the relief is internal of the system, it prevents the wastage and hazards which are present when an external relief device is actuated.

Still another object of my invention is to provide a system in which vapor may be removed for use directly from the storage tank so that vapor is available when the heat exchanger is cold.

Referring to the drawings, there is shown in Figure 1, a liquid fuel handling system, part of the drawing being schematic and part being in cross section. Figure 2 is a section on the line 2—2 of Figure 1 showing the internal construction of one of the valves used in my improved system.

Referring to the drawing by reference characters, there is shown a tank 4 containing a liquefied hydrocarbon, such as propane 6, which is connected to a first stage regulator 8. The tank 4 is equipped with a safety valve 5. The first stage regulator 8 has a diaphragm 10 therein, which is connected through a suitable linkage to a valve member 12. A spring 14 presses against the diaphragm and tends to normally hold the valve member 12 open. As pressure is built up within the first stage regulator 8, the pressure against the diphragm 10 will tend to close the valve 12. Thus, only gas or liquid of a predetermined pressure is allowed to pass through the first stage regulator 8. In normal practice, the regulator 8 may be set so that the valve 12 is closed when the pressure is above about 8 p. s. i. g.

While considerable vaporization takes place at the first stage regulator 8, this reduction in pressure does not completely vaporize the liquefied gas.

To complete the vaporization process, a heat exchanger 16 is provided which has an inlet 18 and an outlet 20 for a heat exchanger medium, ordinarily from the hot water cooling system of an engine, and a coil 22, or similar expansion chamber, which serves as a vaporization chamber for the gas. A safety relief valve 24 is provided so that if excessive pressures are built up within the system, such as is caused by a sudden lessening of the demand for gas, the vapor will be released. To utilize the gas from such a system, a second valve must be used. This could be an ordinary valve or, if it is desired to take the gas off at a constant pressure, it could be a second pressure regulating valve such as that shown at 8. In the particular embodiment illustrated, the regulating valve is a sub-atmospheric balanced regulator 26. However, it might also take the form of a multi-stage regulating system.

The regulator 26 contains two chambers, an inner chamber 28 and an outer chamber 30. In the outer chamber 30 a diaphragm 32 is provided on which is mounted a shaft 34 carrying two valve members 38 and 40. The valve members 38 and 40 cooperate respectively with valve seats 42 and 44, which form a part of the chamber 28. A spring 36 mounted on the exterior of chamber 28 presses against the diaphragm and keeps the valves normally closed. As can be seen, neither external nor internal pressures will have any direct effect on the position of the valves 38 and 40 for the reason that any force which tends to close one will tend to open the other and vice versa. Therefore, the valves 38 and 40 are controlled solely by the movement of the diaphragm 32.

An outlet 46 for the outer chamber 30 is provided to remove gas from the regulator. The adjustment of the spring 36 and the diaphragm 32 is such in the valve illustrated that if atmospheric pressure exists on line 46, the valves will be closed.

There is shown schematically at 48, the venturi of a carburetor connected to line 46. Line 46 may be equipped with a needle valve 47. When air passes through the venturi, the pressure in line 46 will be reduced, which in turn will cause the diaphragm 32 to be lowered and the valves 38 and 40 to be opened. In other applications, for instance, if gas is used for heating, the regulator would be set to give a small positive pressure rather than cutting off at atmospheric pressure. Or, to fit the present case, multi-stage regulation might be introduced.

The equipment thus far described is illustrative of the present commercial practice in using propane as a fuel in motor vehicles. The first stage regulator valve 8 serves not only as a regulator, but as can be seen, also has the effect of a check valve since, an increase in pressure downstream of this valve tends to close the valve. Therefore, if the demand for gas is suddenly lessened, such as is caused when a motor vehicle reaches the top of a long hill, or when the engine is shut off, or reduced to an idle condition, the heat exchanger 16 will be oversupplied with propane, part of which will be in the liquid form. Upon such reduction of demand, the heat in the heat exchanger will be more than sufficient to vaporize all of the propane remaining so that an excessively high pressure will be built up in this part of the system. With the system thus far described, this pressure can only be relieved by the safety valve 24. As has been mentioned before, this is both wasteful and hazardous. Further, since the only way in which propane can get from the tank 4 to the carburetor 48 in conventional systems is by the taking of liquid from the bottom of the tank and vaporizing it, it is apparent that vapor in the space above the liquid in the storage tank 4 will not be available for starting or running the vehicle. It is also apparent that as pressure builds up in the storage tank 4 due to high ambient temperatures, wasteful and hazardous relief of the excessive pressure will be to the atmosphere via safety relief valve 5.

To overcome these objections, I provide another valve in the system which I call a compounding relief valve. The compounding relief valve indicated generally at 50, is made of an upper section 51 and a lower section 52 with a diaphragm 54 secured between the two sections. A bleeder orifice 53 is provided in section 51. The diaphragm is held to the lower limit of its travel by a spring 56 and the tension on the spring may be regulated by turning a threaded member 58. I also provide a lock nut 59 for the purpose of locking the adjusting member 58 in any desired position and a gasket 61 for sealing off the adjusting mechanism so that diaphragm movement may be dampened by selection of bleed orifice size. The lower part, 52, of the copounding relief valve contains an annular recess 60 and a central round recess 62. The shoulder 64 between the recesses 60 and 62 serves as a valve seat for the diaphragm 54. Recess 62 has an opening 66 which is connected through line 70, as is shown, to the balanced regulator valve and to the vaporizer down stream of liquid regulating valve 8. Recess 60 has an opening 68 which is connected through line 72 to the vapor space above the liquid in the storage tank 4.

When sufficient pressure exists in either or both of lines 72 and 70, the valve will be unseated, allowing the pressures to at least partially equalize. Thus, if the engine is cold and high pressure exists in the storage tank 4, the valve 50 will be open, allowing vapor to pass directly from the storage tank 4 to the balanced regulator and the carburetor or to other regulating mechanisms. On the other hand, if the unit has been in operation for some time so most or all of the liquefied gas is being taken from the bottom of tank 4, and the demand suddenly ceases, permitting a high pressure to exist in the line from the heat exchanger 16, the valve 50 will be opened, permitting the excess vapor to go back to the storage tank and obviating the necessity of relieving the vapor to the atmosphere. If, while the equipment is being operated, it is exposed to a high ambient temperature so that considerable pressure develops in the storage tank 4, the valve 50 will open, permitting the excess vapor to flow to the carburetor or other regulating mechanism, ensuring that the pressure in the storage tank will not be above a predetermined level after the completion of an operation. Thus, the storage tank pressure will be reduced as to readily be filled without resorting to the use of high pressure equipment.

In the preferred embodiment of the invention the area of diaphragm 54 which is exposed to the recess 60 is about three times that exposed to the recess 62. In the closed position, tank pressure is acting on the larger annular diaphragm area urging it upward against spring tension, while heat exchanger pressure is adding to this force by acting on the smaller central area. In the open position the entire diaphragm area is activated by the prevailing pressure. (Essentially this will be tank pressure since it is the larger, and therefore, governing body of stored liquefied gas—any further tendency toward increase in pressure due to vaporization within the heat exchanger will result in a flow of gas into the previously refrigerated storage.) Thus, when the diaphragm is unseated this prevailing pressure must then correspondingly be reduced to effect closing and this range may be altered by varying the relative sizes of the openings. Typically, if the valve were set to seat and close off when storage tank pressure fell to 40 p. s. i., and the liquid regulator were set at 8 p. s. i. and no build up occurred in the vaporizer due to demand changes the valve would re-open when the tank pressure rode to 50⅔ p. s. i. Or, by a combined rise in vaporizer and tank pressure, the valve would re-open at a vaporizer pressure of from slightly over 8 p. s. i. to 40 p. s. i., depending on the tank pressure at the time.

Although the system has been described in connection with the operation of a motor vehicle it is apparent that many variations can be made in the equipment and it can be applied to many uses without departing from the scope of my invention. For instance, I have shown a system using propane. Instead of propane one could use butane, butylene, propylene or mixtures of any of these. The heat exchanger 16 is shown as being provided with hot water connections but under many circumstances air or other fluids could be used as the heat exchange medium. The regulating system may be used in any application where it is desirous to handle liquefied gases such as ammonia, carbon dioxide, Freons, such as dichlorodifluoro methene, sulphur dioxide and the like, but not limited to the foregoing.

I claim:

1. In a system for vaporizing liquified gas including a storage tank and a vaporizer for liquified gas, said vaporizer having an outlet and an inlet, said inlet being connected to the bottom of the storage tank whereby liquid from the bottom of the tank can enter the vaporizer, a pressure operated valve having two lines leading thereto and means whereby pressure in either of said lines causes said valve to open placing said lines in communication with each other, one of said lines being connected to the outlet of said vaporizer and the other of said lines being connected to the vapor space above the liquid in the storage tank, whereby said valve will be opened upon application of a predetermined pressure in either the vaporizer or the vapor space above the storage tank.

2. In a system for vaporizing liquefied gas including a storage tank, means for drawing liquid from the bottom of the storage tank, a first stage regulator to reduce the pressure of such said liquid, a heat exchanger for vaporizing said liquid and a pressure operated valve having two lines leading thereto and means whereby pressure on either of said lines will cause said lines to be placed in fluid communication with each other, one of said lines being connected to the space above the liquid in the storage tank and the other of said lines being connected to the heat exchanger whereby said valve will be opened upon the application of a predetermined pressure in said lines.

3. The system of claim 2 wherein the valve comprises a diaphragm actuated by pressure applied to the two lines, and has an area acted upon by pressure in one line about three times the area acted upon by pressure in the other line.

References Cited in the file of this patent

UNITED STATES PATENTS

| | | |
|---|---|---|
| 963,045 | Hulse | July 5, 1910 |
| 1,087,890 | Rogers | Feb. 17, 1914 |
| 1,773,726 | Deming | Aug. 26, 1930 |
| 2,226,810 | Ensign et al. | Dec. 31, 1940 |
| 2,271,497 | Newell | Jan. 27, 1940 |
| 2,381,287 | Iller | Aug. 7, 1945 |
| 2,456,889 | Olson | Dec. 21, 1948 |
| 2,456,890 | St. Clair | Dec. 21, 1948 |
| 2,462,189 | Hess | Feb. 22, 1949 |
| 2,493,369 | Smith | Jan. 3, 1950 |
| 2,599,979 | Drane | June 10, 1952 |